US 9,297,881 B2

(12) United States Patent
Khosravy et al.

(10) Patent No.: US 9,297,881 B2
(45) Date of Patent: Mar. 29, 2016

(54) DEVICE POSITIONING VIA DEVICE-SENSED DATA EVALUATION

(75) Inventors: Moe Khosravy, Bellevue, WA (US); Christian Liensberger, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 79 days.

(21) Appl. No.: 13/295,651

(22) Filed: Nov. 14, 2011

(65) Prior Publication Data

US 2013/0124081 A1    May 16, 2013

(51) Int. Cl.
| G01C 21/00 | (2006.01) |
| G01S 5/02 | (2010.01) |
| G01S 19/48 | (2010.01) |
| H04W 4/02 | (2009.01) |
| G01C 21/20 | (2006.01) |

(52) U.S. Cl.
CPC .............. *G01S 5/0252* (2013.01); *G01S 5/0257* (2013.01); *G01S 5/0263* (2013.01); *G01S 19/48* (2013.01); *G01C 21/206* (2013.01); *H04W 4/02* (2013.01)

(58) Field of Classification Search
CPC .................... G06F 17/30247; G06F 17/30256; G01C 21/005; G01C 21/165; G01S 5/0252; G01S 5/0263; G01S 19/48
USPC .................................. 701/408, 472, 483, 489
See application file for complete search history.

(56) References Cited

U.S. PATENT DOCUMENTS

| 6,323,807 | B1 * | 11/2001 | Golding et al. ............... 342/419 |
| 6,985,903 | B2 * | 1/2006 | Biacs ..................................... 1/1 |
| 7,471,243 | B2 * | 12/2008 | Roslak ........................... 342/463 |
| 7,739,033 | B2 * | 6/2010 | Murata et al. ................. 701/468 |
| 8,131,118 | B1 * | 3/2012 | Jing et al. ...................... 382/305 |
| 8,320,932 | B2 * | 11/2012 | Pinder et al. ............... 455/456.1 |
| 8,483,715 | B2 * | 7/2013 | Chen ........................... 455/456.3 |
| 2004/0027243 | A1 | 2/2004 | Carrender |

(Continued)

FOREIGN PATENT DOCUMENTS

| CN | 101173859 | 5/2008 |
| CN | 201611891 | 10/2010 |

(Continued)

OTHER PUBLICATIONS

Golding, Andrew R., "Indoor navigation using a diverse set of cheap, wearable sensors", Technical Report TR-99-32, Jul. 1999, Mitsubishi Electric Research Laboratories, Inc., 12 pages, downloaded from http://www.merl.com/publications/docs/TR99-32.pdf.*

(Continued)

*Primary Examiner* — Behrang Badii
*Assistant Examiner* — David Testardi
(74) *Attorney, Agent, or Firm* — Nicholas Chen; Doug Barker; Micky Minhas

(57) ABSTRACT

The subject disclosure is directed towards a technology by which data sensed at a device may be used to determine the likely location of the device, independent of whether GPS data is also available. In one aspect, information representing the sensed device data is sent to a remote service, where it is compared with similar information for known locations to find a matching location. In another aspect, the information is locally processed against locally cached information to find a matching location.

20 Claims, 4 Drawing Sheets

(56) References Cited

U.S. PATENT DOCUMENTS

| | | |
|---|---|---|
| 2008/0122695 A1 | 5/2008 | Wang et al. |
| 2008/0226130 A1* | 9/2008 | Kansal et al. .................. 382/106 |
| 2009/0228204 A1* | 9/2009 | Zavoli et al. .................. 701/208 |
| 2011/0066372 A1* | 3/2011 | Sakashita ...................... 701/208 |
| 2011/0199259 A1* | 8/2011 | Karaoguz et al. ........ 342/357.28 |
| 2011/0285591 A1* | 11/2011 | Wong ............................ 342/451 |
| 2012/0020189 A1* | 1/2012 | Agevik et al. .................. 367/127 |
| 2012/0052872 A1* | 3/2012 | Do .............................. 455/456.1 |
| 2012/0072110 A1* | 3/2012 | Venkatraman ................. 701/434 |
| 2012/0083285 A1* | 4/2012 | Shatsky et al. ............. 455/456.1 |
| 2012/0083286 A1* | 4/2012 | Kim et al. .................. 455/456.1 |
| 2012/0098700 A1* | 4/2012 | Diggelen ................. 342/357.28 |
| 2012/0310968 A1* | 12/2012 | Tseng ............................ 707/769 |
| 2013/0116968 A1 | 5/2013 | Wirola et al. |

FOREIGN PATENT DOCUMENTS

| | | | |
|---|---|---|---|
| JP | 2010008154 A | * | 1/2010 |
| WO | 2009/118043 A1 | | 10/2009 |

OTHER PUBLICATIONS

JPO machine translation of JP 2010-8154 (original JP document published Jan. 14, 2010).*

Wikipedia article, "Topography", Old revision dated Nov. 9, 2011 (6 pages).*

"European Search Report for EP Patent Application No. 12192573.9", Mailed Date: May 13, 2014, 6 pages.

Wirola, et al., "Mass-market Requirements for Indoor Positioning and Indoor Navigation", in 2010 International Conference On Indoor Positioning and Indoor Navigation (IPIN), Sep. 15-17, 2010, Zurich, Switzerland, 7 pages.

First Office Action and Search Report for Chinese Patent Application No. 201210453841.9, mailed Dec. 12, 2014, 12 Pages.

* cited by examiner

DEVICE POSITIONING VIA DEVICE-SENSED DATA EVALUATION

BACKGROUND

There are many situations in which a mobile device user is not able to get a global positioning system (GPS) signal to determine his or her precise location. This may be due to interference, or because of poor exposure to the GPS satellites (e.g., due to the terrain or environment, such as because of trees or buildings, or when underwater or underground). Moreover, not all mobile devices have GPS capabilities.

One solution to determine a global position without adequate GPS signals is assisted GPS. Assisted GPS relies on Wi-Fi network communication with an assisting server. Another solution that attempts to determine a global position without GPS at all is to use triangulation and multilateration based upon cellular towers, which rely on the presence of cell towers that are able to communicate with the device. However, these resources are not always available, and even when available, these alternative solutions often do not tend to work particularly well.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which by which a location determination mechanism (e.g., running as executable code) automatically determines a likely location of a device based upon information corresponding to data sensed at the device. The information is matched against a set of known locations maintained in a data store, in which each known location in the set is associated with another set of information that corresponds to sensed data for that known location. Example data that may be sensed at the device includes altitude data, environment-related data, audio data, image data motion data and/or direction data. Current state data may be used to update any of the sets of information for the known locations.

In one aspect, the location determination mechanism is coupled to the device through a remote communications medium, such as when the location determination mechanism comprises a cloud-based service. In an alternative operating scenario, the location determination mechanism and at least part of the data store may be incorporated into the device.

In one aspect, at least some of the device-related information may be represented as device feature data, with at least some of the information in the sets of information for the known locations comprising known location feature data. Processing the device-related information comprises comparing a device (e.g., weighted) feature vector representing the device feature data against known location (e.g., similarly weighted) feature vectors representing the known location feature data to determine a similarity measure of the device feature vector and each of the known location feature vectors.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a technology by which other signal receivers and/or sensors on a mobile device, possibly with other augmented data, are used for location determination to accurately place a user at a position in the world. In general, the technology creates a digital fingerprint of a device's location via various sensors and data and matches the created digital fingerprint with a digital fingerprint of the globe to detect location.

It should be understood that any of the examples herein are non-limiting. For example, while a mobile device/smartphone are used as examples herein, at least some of the concepts described herein are applicable to other computing systems, such as laptops and tablets, dedicated positioning devices, automobile-based devices, construction equipment, military equipment, medical equipment, and even devices not typically considered mobile such as a desktop personal computer or the like. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and location determination in general.

Figure 1:
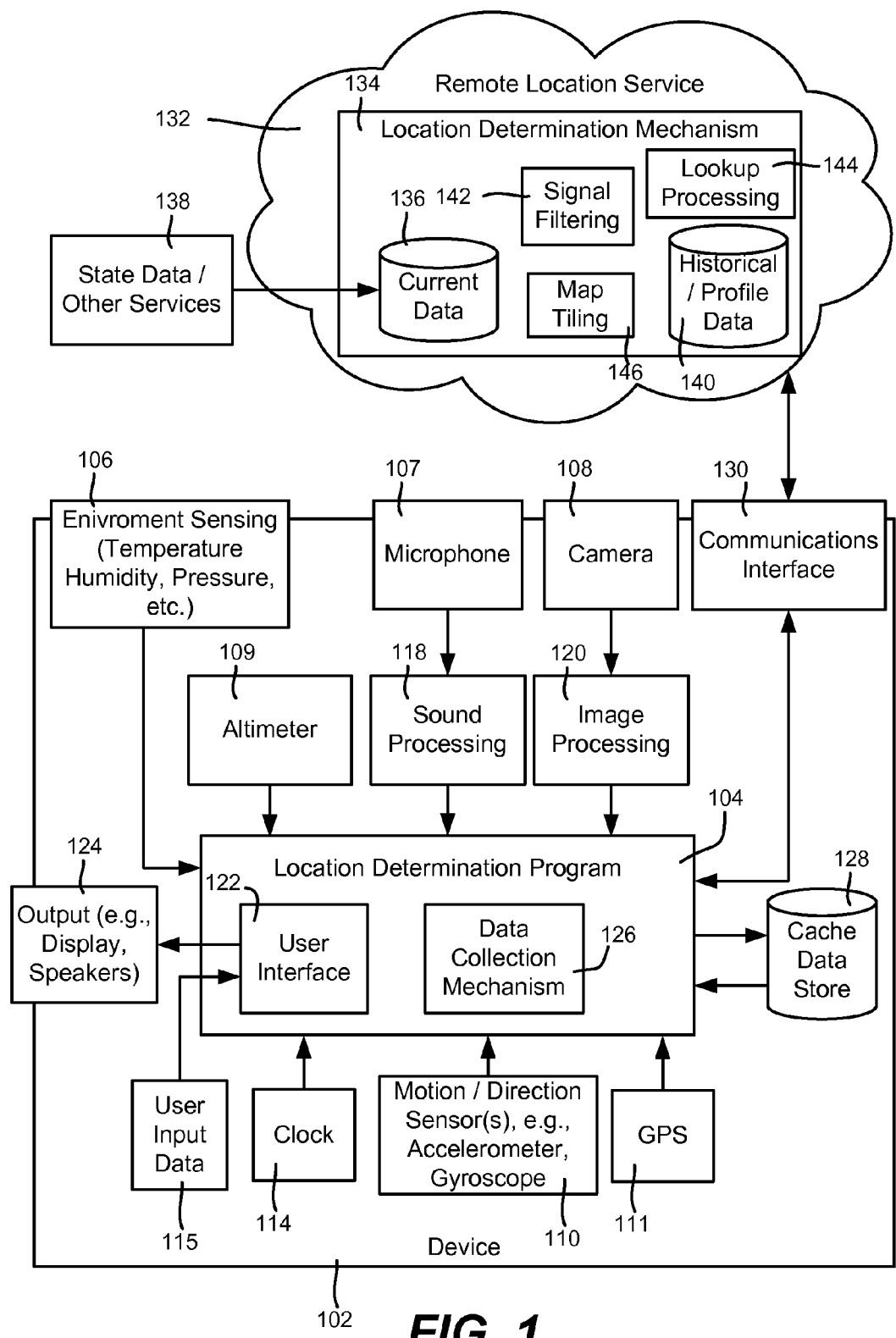
FIG. 1 is a block diagram representing example components configured to determine location via a remote service based upon various sensed data according to one example embodiment.

FIG. 1 is a block diagram showing various components in one example implementation. In general, input from any number of a plurality of device sensors, possibly along with other data may be used to determine a likely location of a user. This may be accomplished in part by leveraging a network connection and cloud service as in FIG. 1, or to the extent such resources are not available, may be accomplished offline with respect to any network connection (as described below with reference to FIG. 2).

As represented in FIG. 1, a device 102 includes a location determination program 104 (e.g., an application) that is configured to receive input directly or indirectly from sensors 106-111 that are available on the device. Example sensors that are illustrated include one or more current environmental condition—(e.g., weather) related sensors 106 (e.g., for measuring temperature, humidity, pressure), a microphone 107, a camera 108, and altimeter 109, one or more motion/direction-related sensors 110 (e.g., an accelerometer and/or gyroscope) and a GPS sensor 111. Not all of the illustrated sensors may be present on a given device; one or more other sensors may be present instead of or in addition to those exemplified in FIG. 1. As will be understood, if present, the GPS sensor 111 may not be operational or reliable due to current conditions, however as described herein any prior knowledge obtained from the GPS sensor 111 may be used by the location determination mechanism 104.

In addition to sensor-provided data, other input may be received by the location determination mechanism 104. As exemplified in FIG. 1, this may include clock data 114 (date and time) and user input data 115. For example, a user may be lost, but may be able to provide some information, such as "on a hiking trip in Montana" or the like that the location determination mechanism 104 may use to narrow down the user's location. Further, the user may be able to provide other input information corresponding to a sensor when such a sensor is not available. For example, some visible signs (e.g., at train stations or at city limits) provide altitude information, which the user may manually enter and submit. As another example, a device may not have a thermometer, but the user may know from another source (e.g., a sign in front of a bank) that the temperature is eighty degrees Fahrenheit and enter that, or instead enter an estimate (it feels somewhere between seventy and ninety degrees Fahrenheit). For manually-entered or otherwise potentially suspect data, the service may widen the range to account for user error.

As shown in FIG. 1, the microphone input 107 may be processed by the sound processing mechanism 118, and/or the video input by an image processing mechanism 120. For example, the sound processing mechanism 118 may convert the audio to a particular format, or may sample the audio input into a digital fingerprint/set of audio features. The image processing mechanism 120 may process one or more captured images (which may correspond to video) to identify certain features of the images. These components are shown in FIG. 1 as being coupled to the location determination program 104, however one or both instead may be incorporated into the location determination program 104. At least one signal filtering mechanism 122 (shown incorporated into the location determination program 104 but alternatively an external component coupled thereto) may be used as part of this process.

In general, the location determination program 104 provides a user interface 122 by which the user input data 115 is received, and by which information is output to the user, such as to a display, speakers, vibration mechanism, and/or the like, represented in FIG. 1 by the output block 124.

The location determination program 104 includes a data collection mechanism 126 that collects the various sensor-provided and other data. Some or all of the collected data may be cached in a cache data store 128. For example, instead of only using relatively current data, sensor data for the last ten minutes may be collected, (each sensor may have a different collection time).

Via a suitable communications interface 130 (which for example represents software, hardware and an antenna), the data (or some formatted, compressed and/or other encoded representation of the data) is sent to a remote location service 132, e.g., a cloud-based service. This may be on demand/per user request, periodically (e.g., send the data in anticipation of being needed) or on some other time schedule (when the amount of cached data reaches a certain limit).

As described herein, the remote location service 132 includes a location determination mechanism 134 that processes the various data received from the device and determines the user location (or a set of likely locations) corresponding to that data. To this end, the location determination mechanism may use current data 136 (received from block 138, representing state data, e.g., current time, and/or from other services e.g., that provide current weather conditions), along with historical and previously obtained profile (such as topography) data 140, to determine the location. Signal filtering 142 such as to provide normalization, and lookup processing 144, such as matching a vector (e.g., via cosine similarity or the like) corresponding to the device-provided data with vectors corresponding to locations on earth, may be used in the determination. Note that the data associated with each location may be kept as information in any suitable form, such as feature data representative of the sensed data for that location.

Also shown in FIG. 1 is a map tiling mechanism 146, which allows the remote location service 132 to use topography data as described below (and possibly return a visible map in response to the user along with other location-related data, such as latitude, longitude and altitude data, as well as more user-friendly data such as the address of a building that the user is currently in).

By way of an example, consider that a user needs to know where he currently is, such as because the user is lost or needs directions, but does not have GPS or an adequate GPS signal. Based upon the topography data for the world's surface area, and a device's extremely accurate altimeter, a location determination mechanism may very quickly narrow the possible locations for the user to a small subset that is reasonable to process. In one implementation, the topography data is tiled to allow granular access to the content in various levels of detail, similar to a map view. As an altimeter produces data in a radius of thirty feet, for example, the topography data is used to bring in finer levels of detail for tiles that map into that range. This efficient lookup allows for fast processing of the millions of tiles that are otherwise needed to describe the full surface area.

Thus, by sampling where a user is (e.g., walking or driving) and matching the device's altitude readings against a topography map, there is provided a rough approximation of where a user can be in the world. Through one or more other additional readings and signals as described herein, the user location becomes more and more accurately determinable as more data is processed.

For example, by including date and weather data, the location determination mechanism 132 may use historical and/or real-time readings to match the possible topography reads with date and weather to eliminate locations. For example, if the user is at altitude range of [x, y] and the temperature is negative ten degrees Fahrenheit, the user most likely cannot be in Las Vegas in July, even though Las Vegas is within that altitude range. In a big city, the altitude range and/or user input may account for tall buildings and other terrain. Weather data combined with accurate and altimeter reading is one way to obtain a fast fingerprint map of the world. Humidity, barometric pressure and other weather-related data may further be used to narrow in on the user's location; water temperature, pressure data and/or water depth data also may be sensed as a current environmental condition.

Additional data such as ambient noise data and/or image data may be used as location clues. To this end, techniques such as sound processing and/or image processing may be used to filter the possible locations of the person. Sound processing may be used to create a noise fingerprint of the location of the person. During sound processing, various properties of the sound are analyzed, including loudness, whether the sound has a constant noise component, and so forth. Algorithms to compare the noise against other noise fingerprints may be used to establish whether noise is traffic noise, airplane noise, people speaking, wind, water (e.g., a waterfall), and so forth.

For example, if audio processing detects that there is a lot of traffic noise, and the time indicates that it is during the day, the person almost certainly is not in a remote area but rather is in a city. If the traffic noise is loud yet it is during the night, the user is more likely in a larger city. Knowing the date helps in matching a sound profile, e.g., on Sundays, the downtown area of a city has a different sound profile than on Wednesdays.

Image processing detects elements in the images to understand whether an image contains buildings, trees, forest, rivers, and so forth. Further, color analysis may be performed to understand whether someone is in a city, somewhere outdoors, whether there is a blue sky or gray sky, and so forth.

Motion/direction-based sensing may be used to establish whether a user is walking, and in what direction. Over a number of readings, along with altimeter data, this may be used to determine whether a user is walking uphill or downhill, for example. A user that is ascending or descending too rapidly for running or walking is likely driving.

In one implementation, the device-provided data may be provided as an array of values corresponding to features. Each of these features may be weighted based upon known good data, for example, seeded by providing sensor readings taken at known locations, and/or by collecting sets of user feedback that each indicates when a given location determination was correct; data may be sent for the service to learn from it, e.g., a person may send a specific location (an address, or GPS coordinates when available) along with the data so that the service learns about that specific location. As can be appreciated, any number of techniques and/or mechanisms may be used to match unknown ("query") input data against a store of existing/known data, including filtering, database lookups, and so forth. Thus, while optional pre-filtering and vector matching are used as an example matching technology herein, it is understood that this is only a non-limiting example.

For a given location determination operation, these weighted device-based features, comprising a vector, may be matched against vectors representing locations on the earth to find the closest location (or a set of most likely candidate locations if a confidence level for one location is not sufficiently high). Some pre-filtering of the vectors (similar to query optimization) may be performed to reduce the set of vectors to a smaller subset based upon some of the data. For example, the altimeter reading may be used as a filter to reduce the number of location vectors from millions to possibly hundreds or dozens, so that vector similarity comparisons are performed against the device data's vector on only that reduced subset.

Not all of the features need to be used to provide the location information; indeed, using multiple sensor and other data to identify the location makes the determination mechanism robust even when some data/services are not available or do not provide useful insight. For example, image processing, sound processing or some web services might not be available, and/or a device may not have a particular sensor or sensors.

Some missing feature data may be inferred. An image showing snow on trees may be used to infer a temperature range, using statistics. If GPS data was available awhile ago, an area may be chosen based upon how far a user may have possibly traveled since the last GPS reading, particularly if the user is known to have been driving or walking, which may be determined via matching profiles of other sensors.

For any data features not provided or inferred, the remote location service excludes the corresponding features from its representative vectors to determine the location or locations, which may lower confidence yet still provide a reasonable location estimate or set of estimates. In sum, given the various additional ways to identify the location, not all of the sensors need to be available to still provide good results by leveraging the other sensors.

Moreover, as more profile and/or historical data 140 is collected over time, the remote location service 132 is able to further tune the weights and/or location-representative vectors that it uses to match with the device-provided data. This likely increases the confidence. To this end, the device 102 and other such devices send the information they have gathered to the service 132. This helps the system learn more and more of the characteristics of the various locations and improve the location detection accuracy over time. Newly gathered information can be used with a future user to determine the location even when other components are not present, and/or to help improve the location detection accuracy going forward.

In sum, FIG. 1 exemplifies using a remote location (cloud) service 132 that takes in various device-sensed data and other data, and performs lookups and/or other processing to get a reasonable determination of where the user likely is located as he or she moves about. The remote location (cloud) service 132 may be in the form of a web service-based API, or other suitable form.

Such an online connection may not always be available, however, and thus the technology described herein includes an alternative solution in which the logic of topography tiling (and/or other map tiling), lookups and signal filtering and processing may be performed on the device, providing for a completely offline operation if needed.

Figure 2:
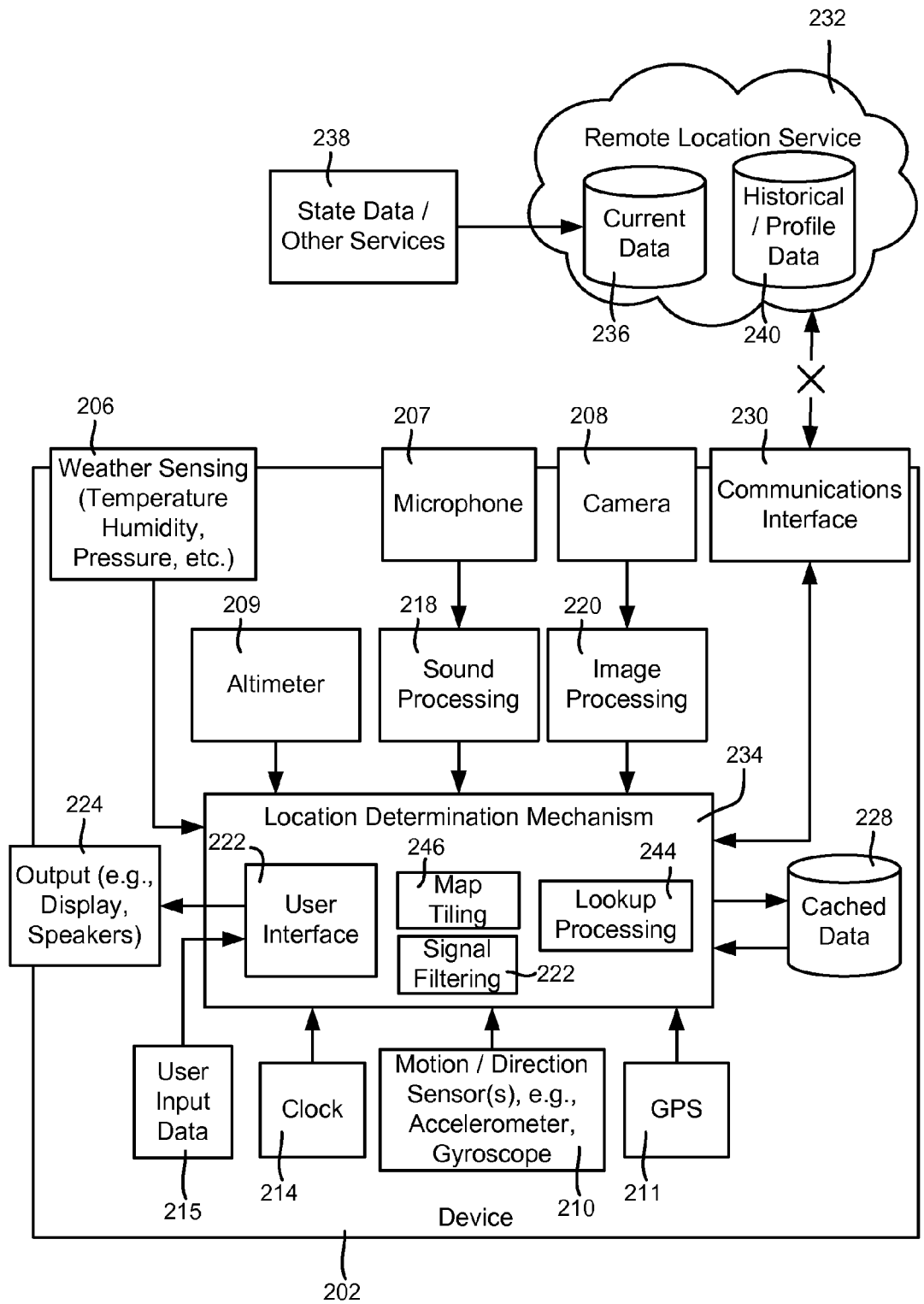
FIG. 2 is a is a block diagram representing example components configured to determine location based upon local processing of various sensed data according to one example embodiment.

FIG. 2 shows an example implementation somewhat similar to that of FIG. 1 (and has like components numbered with 2xx instead of 1xx), however in FIG. 2 a remote connection may not be available at the time of location determination, whereby local processing on cached data 228 performs the location determination. In this embodiment, the device 202 includes a local program that serves as the location determination mechanism 234. Note that even when a remote connection is available, some or all of the local processing may be performed, such as to save data transmission costs, maintain more privacy and/or because the network connection is slow. Some or all of the data may be featurized locally to save on the amount of data transmitted, e.g., send the audio features instead of an audio clip, send the image features instead of an image, and so on.

To obtain the cached data 228, at a prior time when the user is online, the user can perform a spatial query to download and take offline a portion of the historical/profile data 240. For example, the user may query for data related to a region they intend to visit. The cached data 228 may be obtained in other ways, e.g., via a CD-ROM or other media.

The data may be automatically cached for various reasons, such as in anticipation of losing the remote communication, e.g., for a user who is moving towards a location known to have no networking service. In addition to known data such as topological data, a user may specifically request additional relevant data (if known) for a particular purpose, such as a scuba diver requesting underwater data such as the basin and depth information for a lake, or a spelunker requesting underground cave data.

As can be seen in FIG. 2, the example components comprising signal filtering 222, lookup processing 244 and/or map tiling 246 are locally executed on the device 202. This provides functionality in scenarios where no connectivity is possible, including while underwater or in subterranean areas. Any information collected while offline may be uploaded to the remote location service 232 when later online, so that the remote location service 232 may further improve its data store and/or mechanisms.

Turning to another aspect, other uses of the location data including enterprise usage and/or monetization may be implemented. Note that unlike GPS, which only works in one direction, with the technology described herein there is a backchannel from the devices to the service, whereby the locations of users are known.

For example, the location data may be provided to a merchant who wants to know how many users are in a given store location, or near a given store location, and when (including in real time or near real time). If microphone input is available, as is typical with smartphones, a merchant may determine exactly how many users with actively participating smartphones are in a given store location by playing different audio (e.g., different music, or subsonic or supersonic signals) at different locations and/or times, possibly modulated with some signal to act as an identifier. Different departments of a store may have different modulated signals, for example; different speakers may have different signals so that the signals received and the relative volume of each received signal may pinpoint a user within a store. Additional information such as movement profile information sensed by an accelerometer may be used to separate which users are merely looking versus which are likely buyers, so as to direct a sales clerk to the likely buyer first.

Figure 3:
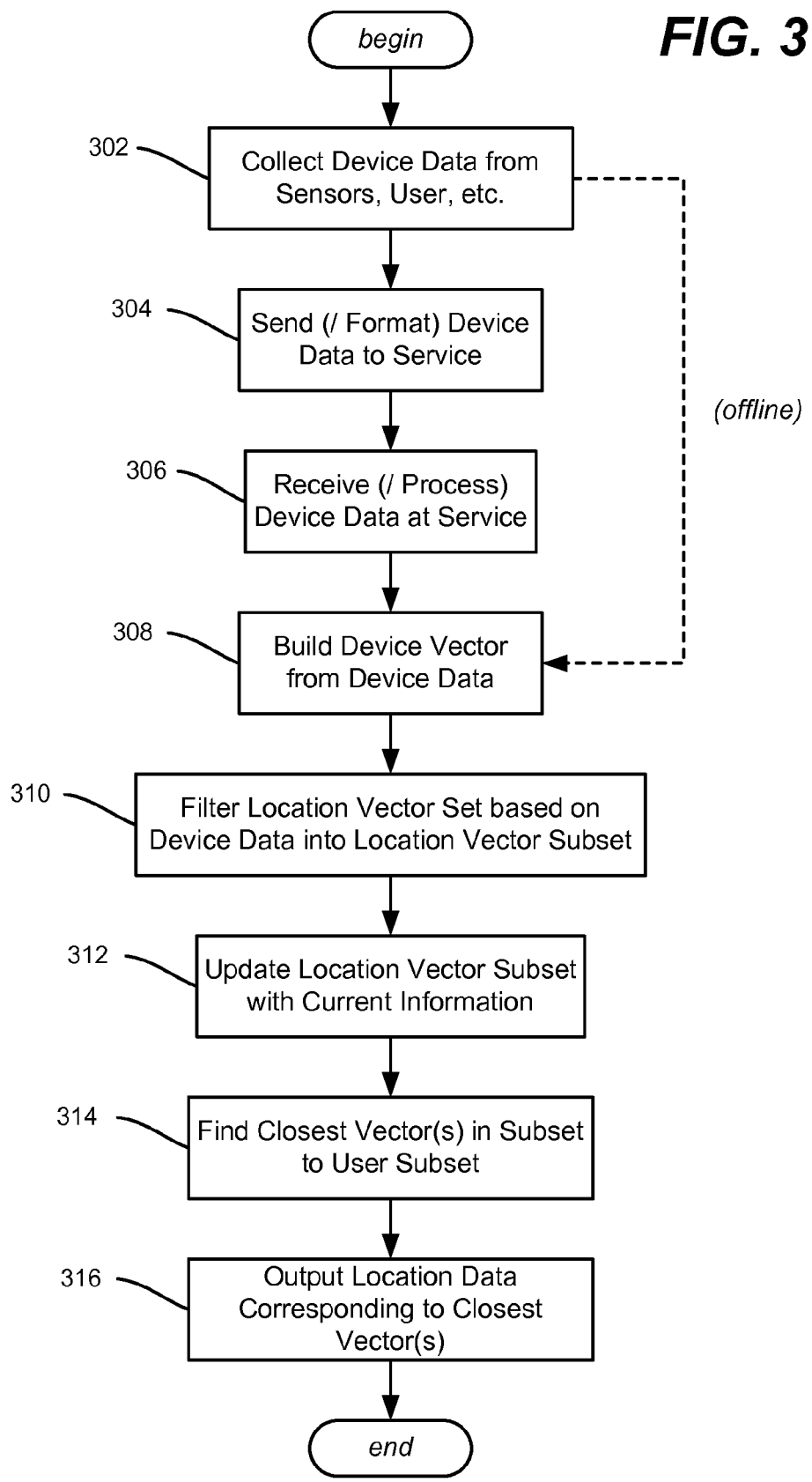
FIG. 3 is a flow diagram representing example steps for determining location based upon various sensed data according to one example embodiment.

FIG. 3 summarizes example steps for location determination based upon various data in the form of a flow diagram according to one example embodiment, beginning at step 302 which represents collecting the data. Data may be collected at a given instant, collected over some timeframe, and/or combined (e.g., averaged) over some timeframe, as suitable for the type of data that is being collected. For example, audio data may be a recording of the most recent five seconds, temperature may be an average over the last two minutes, altitude may be a set of twenty readings taken at thirty second intervals over the last ten minutes and thus shows ascent and descent patterns, and so forth.

Steps 304 and 306 represent operation when a remote service is performing the processing of the data for location determination. Step 304 represents sending the data, which as described above may be transmitted in any appropriate format, e.g., compressed, featurized, encoded and so forth. Step 306 represents receiving the data and processing it as appropriate, e.g., decoding and decompressing the data, and so forth.

Step 308 represents building a "device vector" that represents the device-provided data as weighted features. Note that for offline (local device only) operation, step 302 may advance to step 308 without communication with the remote service.

Step 310 represents using some part of the data to optionally filter the "location vector" set, which is likely very large into a smaller subset, as generally described above. Any of the received data, alone or in combination with other received data (e.g., altitude and temperature), may be used to filter the set into the smaller subset. While not necessary, such filtering and other mechanisms (such as indexing) may be used to facilitate more efficient processing.

Step 312 represents updating the location vector subset with current information. For example, if temperature data was received and is part of the device's input (query) vector, a current temperature (or range) for each possible location needs to be inserted (times its weight) as a weighted feature into the appropriate temperature feature's position in the location vector subset.

Step 314 represents vector matching to find the closest vector in the location vector subset, such as by using cosine similarity measurement techniques. More than one location may be returned, e.g., the ten closest locations based upon vector similarity, along with a similarity score corresponding to a likelihood of a correct match for each location. At step 316, the location data is output, which may include transmitting it from the remote service to the local device in the online scenario. The location data that is output may correspond to a single location (e.g., if the likelihood is sufficiently large), as a ranked list of possible locations, and/or in any other way that is suitable for the device user. For example, the location data may output a single location, with a feedback mechanism (e.g., buttons) or the like that the user can use to accept the location as correct or request that additional likely locations be output.

The output from the location determination mechanism may be displayed as a visible representation of the location or locations. For example, text listing the one or more locations is one possible visible representation. Graphics, images or both, such as a map of the location, is another possible visible representation that may be rendered instead of or in addition to text.

Although not explicitly shown in FIG. 3, the user may provide feedback which in turn may be used to tune the system. For example, using the above-described example feedback mechanism of "correct" or "provide more locations," additional training data is obtained. In the offline scenario, the device may cache the feedback until later online, at which time the feedback can be uploaded along with a saved instance of the sensor and other device data for use in refining the system.

Example Operation Environment

Figure 4:
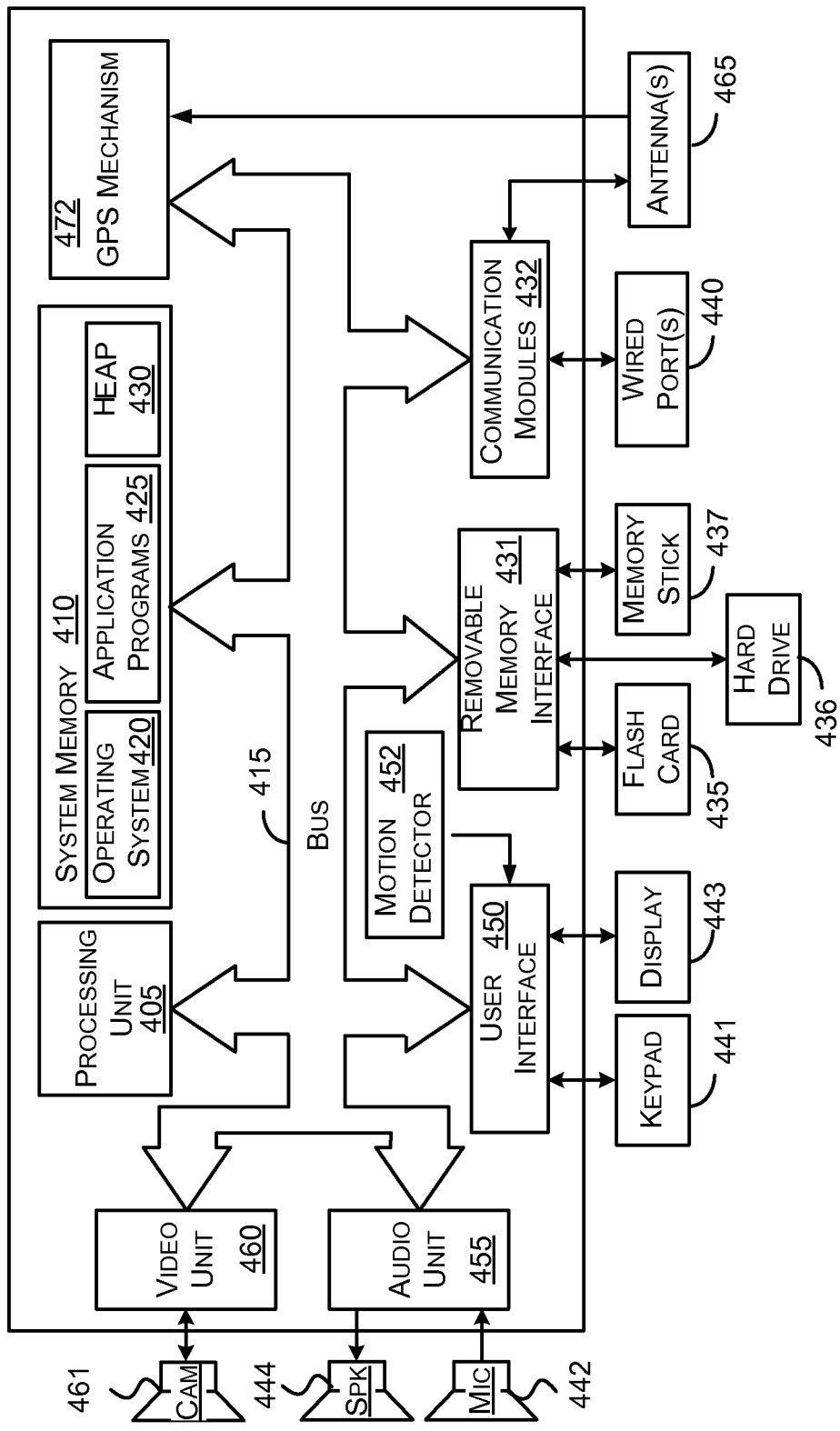
FIG. 4 is a block diagram representing an example non-limiting computing system or operating environment, e.g., in the example of a mobile phone device, in which one or more aspects of various embodiments described herein can be implemented.

FIG. 4 illustrates an example of a suitable mobile device 400 on which aspects of the subject matter described herein may be implemented. The mobile device 400 is only one example of a device and is not intended to suggest any limitation as to the scope of use or functionality of aspects of the subject matter described herein. Neither should the mobile device 400 be interpreted as having any dependency or requirement relating to any one or combination of components illustrated in the example mobile device 400.

With reference to FIG. 4, an example device for implementing aspects of the subject matter described herein includes a mobile device 400. In some embodiments, the mobile device 400 comprises a cell phone, a handheld device that allows voice communications with others, some other voice communications device, or the like. In these embodiments, the mobile device 400 may be equipped with a camera for taking pictures, although this may not be required in other embodiments. In other embodiments, the mobile device 400 may comprise a personal digital assistant (PDA), hand-held gaming device, notebook computer, printer, appliance including a set-top, media center, or other appliance, other mobile devices, or the like. In yet other embodiments, the mobile device 400 may comprise devices that are generally considered non-mobile such as personal computers, servers, or the like.

Components of the mobile device 400 may include, but are not limited to, a processing unit 405, system memory 410, and a bus 415 that couples various system components including the system memory 410 to the processing unit 405. The bus 415 may include any of several types of bus structures including a memory bus, memory controller, a peripheral bus, and a local bus using any of a variety of bus architectures, and the like. The bus 415 allows data to be transmitted between various components of the mobile device 400.

The mobile device 400 may include a variety of computer-readable media. Computer-readable media can be any available media that can be accessed by the mobile device 400 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 400.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 410 includes computer storage media in the form of volatile and/or nonvolatile memory and may include read only memory (ROM) and random access memory (RAM). On a mobile device such as a cell phone, operating system code 420 is sometimes included in ROM although, in other embodiments, this is not required. Similarly, application programs 425 are often placed in RAM although again, in other embodiments, application programs may be placed in ROM or in other computer-readable memory. The heap 430 provides memory for state associated with the operating system 420 and the application programs 425. For example, the operating system 420 and application programs 425 may store variables and data structures in the heap 430 during their operations.

The mobile device 400 may also include other removable/non-removable, volatile/nonvolatile memory. By way of example, FIG. 4 illustrates a flash card 435, a hard disk drive 436, and a memory stick 437. The hard disk drive 436 may be miniaturized to fit in a memory slot, for example. The mobile device 400 may interface with these types of non-volatile removable memory via a removable memory interface 431, or may be connected via a universal serial bus (USB), IEEE 4394, one or more of the wired port(s) 440, or antenna(s) 465. In these embodiments, the removable memory devices 435-937 may interface with the mobile device via the communications module(s) 432. In some embodiments, not all of these types of memory may be included on a single mobile device. In other embodiments, one or more of these and other types of removable memory may be included on a single mobile device.

In some embodiments, the hard disk drive 436 may be connected in such a way as to be more permanently attached to the mobile device 400. For example, the hard disk drive 436 may be connected to an interface such as parallel advanced technology attachment (PATA), serial advanced technology attachment (SATA) or otherwise, which may be connected to the bus 415. In such embodiments, removing the hard drive may involve removing a cover of the mobile device 400 and removing screws or other fasteners that connect the hard drive 436 to support structures within the mobile device 400.

The removable memory devices 435-937 and their associated computer storage media, discussed above and illustrated in FIG. 4, provide storage of computer-readable instructions, program modules, data structures, and other data for the mobile device 400. For example, the removable memory device or devices 435-937 may store images taken by the mobile device 400, voice recordings, contact information, programs, data for the programs and so forth.

A user may enter commands and information into the mobile device 400 through input devices such as a key pad 441 and the microphone 442. In some embodiments, the display 443 may be touch-sensitive screen and may allow a user to enter commands and information thereon. The key pad 441 and display 443 may be connected to the processing unit 405 through a user input interface 450 that is coupled to the bus 415, but may also be connected by other interface and bus structures, such as the communications module(s) 432 and wired port(s) 440. Motion detection 452 can be used to determine gestures made with the device 400.

A user may communicate with other users via speaking into the microphone 442 and via text messages that are entered on the key pad 441 or a touch sensitive display 443, for example. The audio unit 455 may provide electrical signals to drive the speaker 444 as well as receive and digitize audio signals received from the microphone 442.

The mobile device 400 may include a video unit 460 that provides signals to drive a camera 461. The video unit 460 may also receive images obtained by the camera 461 and provide these images to the processing unit 405 and/or memory included on the mobile device 400. The images obtained by the camera 461 may comprise video, one or more images that do not form a video, or some combination thereof.

The communication module(s) 432 may provide signals to and receive signals from one or more antenna(s) 465. One of the antenna(s) 465 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 472. In turn, the GPS mechanism 472 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 400 may connect to one or more remote devices. The remote devices may include a personal computer, a server, a router, a network PC, a cell phone, a media playback device, a peer device or other common network node, and typically includes many or all of the elements described above relative to the mobile device 400.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A mobile device comprising:
a processor and a memory, the processor configured to execute code that is stored in the memory, the code corresponding to at least part of a location determination mechanism which, when executed by the processor, is operative to:
automatically determine at least one likely location of the mobile device based on at least one signal sensed by the mobile device and provided by a satellite navigation positioning system or a network system; and
based on whether the likely location of the mobile device cannot be reliably determined based on the at least one signal, determine the at least one likely location of the mobile device based upon a set of information corresponding at least in part to data sensed at the mobile device that comprises environment-related data and features identified from image data captured by a camera, by matching the set of information against a set of known locations maintained in a data store, in which each known location in the set is associated with other information that corresponds to sensed data for that known location, the other information to include topography data.

2. The mobile device of claim 1 wherein the other information that corresponds to the sensed data for that known location includes tiled topography data for a surface area of that known location.

3. The mobile device of claim 1 wherein the environment-related data comprises at least one of: temperature data, humidity data, or pressure data.

4. The mobile device of claim 1 wherein the data sensed at the device includes audio data.

5. The mobile device of claim 1 wherein the data sensed at the device comprises motion data or direction data, or both motion data and direction data.

6. The mobile device of claim 1 wherein the features extracted from the image data captured at the mobile device include at least one element related to terrain.

7. The mobile device of claim 1 wherein at least part of the set of information comprises user input data.

8. The mobile device of claim 1 wherein the location determination mechanism is coupled to the mobile device through a remote communications medium.

9. The mobile device of claim 1 wherein the location determination mechanism comprises a cloud-based service coupled to the device through a remote communications medium.

10. The mobile device of claim 1 wherein the location determination mechanism and at least part of the data store are incorporated into the mobile device.

11. In a computing device, a method performed at least in part on at least one processor comprising:
automatically determine at least one likely location of the computing device based on at least one signal detected by the computing device and provided by a satellite navigation positioning system or a network system; and
using the at least one processor to process device-related information received as data collected from one or more device sensors to determine the at least one likely location of the computing device when the at least one signal is not reliable, the collected data comprising image data and environment-related data, by:
accessing a data store to obtain a plurality of sets of information, each set of information associated with a known location and the data store including tiled topography data corresponding to content in various levels of detail corresponding to a surface area for that known location,
using the device-related information to reduce the plurality of sets of information to one or more likely sets of information corresponding to one or more likely known locations by matching the collected data against the tiled topography data to eliminate one or more locations, and
outputting, by the computing device, data representative of the one or more likely known locations of the computing device.

12. The method of claim 11 wherein the data store is accessed by a service that is remote relative to the computing device, and wherein outputting the data representative of the one or more likely known locations comprises returning the data representative of the one or more likely known locations in response to a request from the computing device.

13. The method of claim 11 wherein outputting the data representative of the one or more likely known locations comprises displaying a visible representation of at least one of the one or more likely known locations.

14. The method of claim 11 wherein processing the device-related information is performed on the computing device, and further comprising, downloading at least some of the data in the data store from a remote data source.

15. The method of claim 11 wherein processing the device-related information with the plurality of sets of information obtained further comprises:
using at least some of the device-related information in association with current date and weather information to filter the plurality of sets of information to a lesser number of sets of information by matching the data collected from the one or more device sensors against historical data to eliminate one of more locations.

16. The method of claim 11 wherein at least some of the device-related information comprises device feature data, wherein at least some of the information in the sets of information comprises known location feature data, and wherein processing the device-related information comprises comparing a device feature vector representing the device feature data against known location feature vectors representing the known location feature data to determine a similarity measure of the device feature vector and each of the known location feature vectors.

17. The method of claim 11 further comprising, obtaining current state data to update at least part of the plurality of sets of information with current state data.

18. The method of claim 11 further comprising, collecting data representative of the one or more likely known locations for each of a plurality of users, and providing that data to a recipient.

19. One or more memory storage devices having computer-executable instructions, which in response to execution by a computer, cause the computer to perform steps comprising:

automatically determine at least one likely location of the computing device based on at least one signal detected by the computing device and provided by a satellite navigation positioning system or a network system; based on whether a sensor for the satellite navigation positioning system or the network system is not operational or reliable, processing device-related information corresponding to device-sensed data, including audio data and image data captured by a camera at a given location;

matching the device-related information against a plurality of information sets, each information set corresponding to a known location and including at least one noise fingerprint for the known location and environmental data of the known location; and determining a most likely location of a device based upon the matching, including determining whether the device is at the known location based upon a comparison between the audio data and the at least one noise fingerprint and an inference of environmental data for the known location from the image data.

20. The one or more memory storage devices of claim 19 wherein at least some of the device-related information is represented by a weighted feature vector, wherein at least some of each information set is represented by a weighted feature vector, and wherein matching the device-related information against the plurality of known information sets comprises comparing vectors for similarity.

* * * * *